No. 675,406. Patented June 4, 1901.
G. PELTZER.
APPARATUS FOR DEGREASING WOOL.
(Application filed Aug. 29, 1900.)
(No Model.)
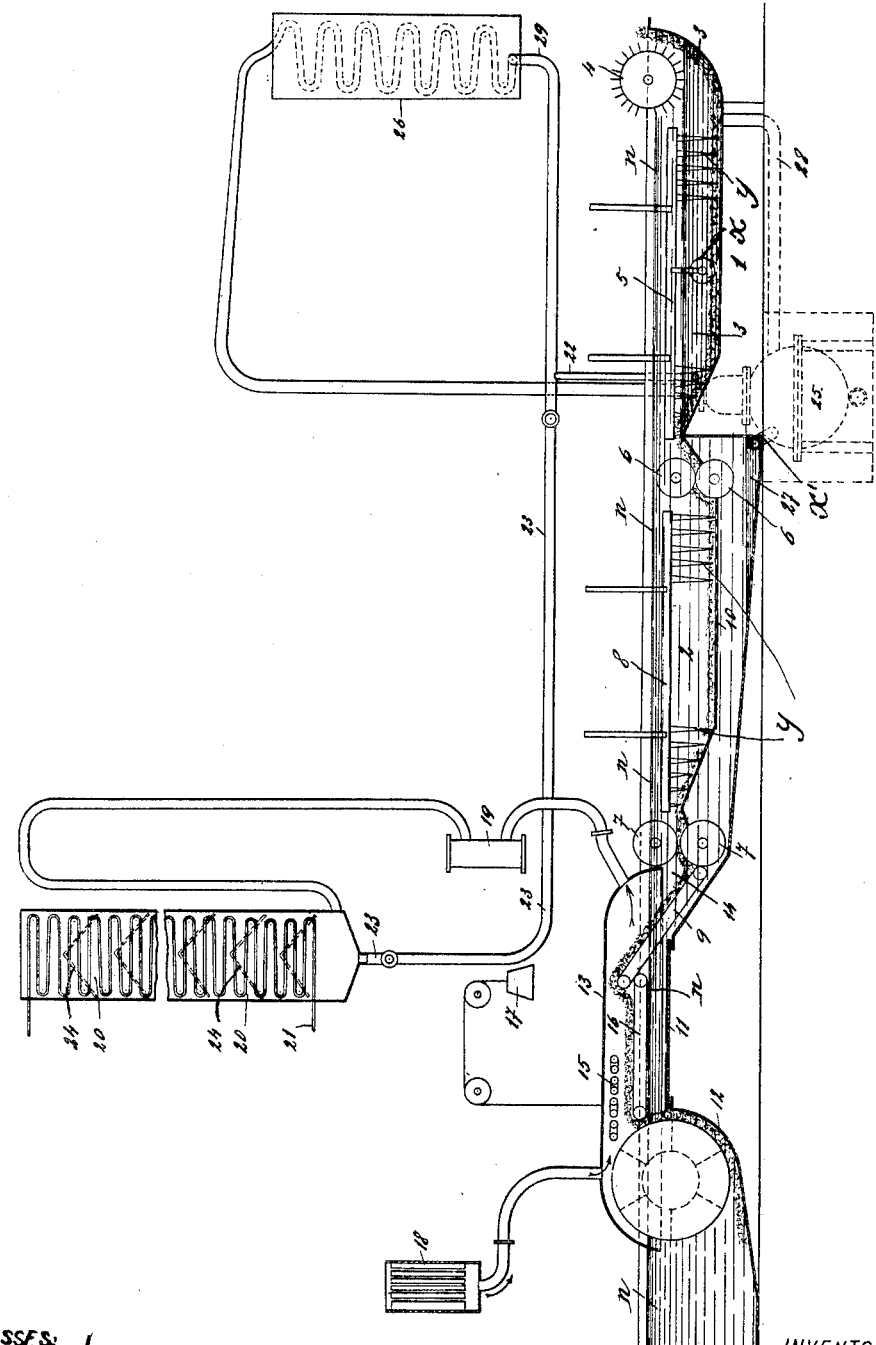
WITNESSES:
INVENTOR
ATTORNEYS

UNITED STATES PATENT OFFICE.

GEORGES PELTZER, OF VERVIERS, BELGIUM.

APPARATUS FOR DEGREASING WOOL.

SPECIFICATION forming part of Letters Patent No. 675,406, dated June 4, 1901.

Application filed August 29, 1900. Serial No. 28,448. (No model.)

*To all whom it may concern:*

Be it known that I, GEORGES PELTZER, a subject of the King of Belgium, and a resident of Renoupré-Verviers, Belgium, have invented a certain new and useful Process for Practical Removal of Fat from Raw Wools, of which the following is a specification.

This invention relates to apparatus for extracting fatty matters from wool by the solvent action of carbon tetrachlorid, the apparatus being so arranged that the tetrachlorid, being of greater specific gravity than water, acts under water and is thereby protected from exposure to air and against loss by evaporation. I shall describe apparatus for this purpose, referring to the accompanying drawing, which is a diagrammatic longitudinal section.

One compartment 1 of a tank contains at 3 carbon tetrachlorid protected from the air by a layer of water up to the level $n'$. This compartment is provided with an immersing-roller 4, furnished with short blades and so arranged that the ends of the blades touch the level of the tetrachlorid and with a propelling, pressing, and elevating apparatus 5 of known kind which keeps immersed in the water and serves to advance the wool along the tank. The roller $x$, suspended from 5, has a squeezing effect on the wool below it, pressing out from it tetrachlorid highly charged with fat. Another compartment 2 of the tank contains water at the same level $n$ as in the first compartment, and it has two pairs of pressing-rollers 6 6 and 7 7, a propelling and elevating apparatus 8, and a perforated plate 10, on which the material travels, also an endless apron 9. In continuation of the compartment 2 is a gutter 11, filled with water up to the level $n$ and leading to any known washing-tank 12, also filled with water to $n$. The gutter is covered by a cover 13, making hydraulic seal by dipping at the same time into the tank 12, the said gutter, and at 14 into the compartment 2. In this cover are placed steam-pipe coils 15, intended to maintain constant temperature in it, and an endless apron 16. In order to give easy access under the cover 13 in case of accident, it can be raised by a set of pulleys with counterweight 17 after moving the pipe-joints. The cover 13 is connected by pipes, on the one hand, to an apparatus 18 for heating air and, on the other hand, to an exhausting and compressing air-pump 19, which by means of the depending projections $y$ is connected to a condensing apparatus. This latter consists of a chamber or column 20, several meters high, filled with water kept cold by a serpentine pipe 21, in which cold water circulates. This chamber can communicate with compartment 1 of the tank by pipes 23 22. In the column 20 are baffles 24 of perforated plates having for their object to subdivide the air as much as possible, so as to separate the air and the carbon tetrachlorid.

The first compartment 1 of the tank is connected by a pipe 28 to a distilling apparatus 25, which is connected to a condenser 26, which can communicate with the bath of tetrachlorid of this compartment by the pipe 29 22. It is of course to be understood that these various pipes are provided with suitable valves.

The apparatus operates as follows: The wool from which, in the first instance, there have been extracted by the usual means the salts soluble in water and the earthy matters is by means of the feeding-roller 4 introduced dry or wet directly into the bath of carbon tetrachlorid (cold or slightly heated) in the compartment 1. The wool thus immersed in the tetrachlorid is subjected to the action of the propelling, pressing, and elevating apparatus 5, which without taking it out of the water (thus preventing evaporation) pushes it toward the squeezing-rollers 6 6, which squeeze out part of the tetrachlorid containing fat extracted from the wool. The wool then enters the bath of water, pure or slightly soapy, (cold or hot,) of the compartment 2, in which by the propelling, pressing, and elevating apparatus 8 it is pushed onto the perforated plate 10 and toward the pressing-rollers 7 7, which squeeze out most of the remaining tetrachlorid. The wool is then led by the endless aprons 9 and 16 to the feeder of the ordinary washing-tank. During its passage on the aprons 9 16 under the hermetically-closed cover 13 the wool impregnated with tetrachlorid is subjected to a draft of hot air moving in a direction opposite to that of the material. This air, already heated, is kept at a suitable constant temperature by the serpentine steam-pipe 15, and its circulation is insured by the pump 19. In its passage under the cover 13 the wool rapidly gives up all its tetrachlorid and retains the water with which it is impregnated. The air charged with tetrachlorid passes through the cold water in the column 20 and deposits its tetrachlorid, which being denser than water is condensed and precipitated to the bottom of the chamber 20, whence the pipes 23 22 lead it back to the compartment 1. The tetrachlorid which in the compartment 2 in presence of water is already separated from the wool passes through the perforated plate 10 and deposits at 27, where also collects the tetrachlorid squeezed out by the pressing-rollers 6 6, and thence it is conducted to the distilling apparatus through pipe X'.

Throughout the apparatus the water kept at the level $n$ prevents evaporation of the tetrachlorid.

The carbon tetrachlorid charged with fat is led to the distilling apparatus 25, where it is separated from the fat. Its vapor is led to the condenser 26, and the condensed liquid is led back by the pipes 29 22 to the compartment 1.

Air is fed to heater 18 through the tubes which are open at the top, there being a partial vacuum under the cover 13, caused by the action of the pump 19.

Having thus described the nature of this invention and the best means I know for carrying the same into practical effect, I claim—

In apparatus for extracting fat from wool by means of carbon tetrachlorid the combination of a tank made in two compartments adapted to contain carbon tetrachlorid and water, in the one compartment a feeding-roller and propelling devices, in the other compartment two pairs of squeezing-rollers, propelling devices, traveling aprons and delivery-roller, a water-sealed cover, an air-pump, air heater and cooler of the air charged with tetrachlorid and a pipe leading thence to the first compartment, substantially as described.

In witness whereof I have hereunto set my hand in presence of two witnesses.

GEORGES PELTZER.

Witnesses:
C. R. CENTNER,
M. BRAHN.